US006421528B1

United States Patent
Rosen et al.

(10) Patent No.: US 6,421,528 B1
(45) Date of Patent: Jul. 16, 2002

(54) SATELLITE TRANSMISSION SYSTEM WITH ADAPTIVE TRANSMISSION LOSS COMPENSATION

(75) Inventors: Harold A. Rosen, Santa Monica; Todd K. Citron, Pacific Palisades; Steven O. Lane, Rolling Hills Estates; James D. Thompson, Manhattan Beach; Arnold L. Berman, Los Angeles; Robert E. Vaughan, Redondo Beach, all of CA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/301,967

(22) Filed: Apr. 29, 1999

(51) Int. Cl.[7] .................................................. H04J 13/02
(52) U.S. Cl. ...................... 455/67.6; 455/13.3; 455/428
(58) Field of Search ................................. 455/67.6, 427, 455/428, 429, 12.1, 11.1, 13.1, 13.3

(56) References Cited

U.S. PATENT DOCUMENTS 5,450,395 A * 9/1995 Hostetter et al. .......... 455/50.1
5,708,679 A * 1/1998 Fernandes et al. .......... 375/200
5,867,109 A * 2/1999 Wiedeman .................. 455/13.1
5,867,769 A * 2/1999 Ichiyanagi .................... 455/69
6,029,044 A * 2/2000 Arsenault et al. ............ 455/3.2

* cited by examiner

Primary Examiner—Daniel Hunter
Assistant Examiner—Thuan T. Nguyen
(74) Attorney, Agent, or Firm—Terje Gudmestad

(57) ABSTRACT

A system and method for adjusting satellite communication signal transmit power for signals transmitted to a localized region within a satellite coverage area utilize real-time information on weather conditions (172) and/or actual path losses (174) within the localized regions to adjust the effective isotropic radiated power (EIRP) of the satellite beams (188) to minimize the total radio frequency (RF) power required for transmission. The transmission system may be realized using a variety of antenna types for transmitting spot beams and/or area coverage beams. Representative antenna implementations include multi-beam antennas having a low-level beamforming network and hybrid matrix amplifier system, phased-array with independent input amplitude control and beamsteering for each beam, and a phased-array feeding a confocal imaging system for single broadcast beam per polarization. The present invention allows for the reduction of RF transmit power to achieve the same communications performance enabling either increases in satellite functionality and/or an increase in total capacity of the satellite communication system.

14 Claims, 9 Drawing Sheets

SATELLITE TRANSMISSION SYSTEM WITH ADAPTIVE TRANSMISSION LOSS COMPENSATION

TECHNICAL FIELD

The present invention relates to satellite-based communications systems which utilize weather information for areas to be serviced by the satellite beams to adjust the effective isotropic radiated power of a portion of the beams and minimize the net RP power required for transmission.

BACKGROUND ART

Satellite-based communications systems are well represented in the prior art. In the typical satellite communication system, signals are transmitted between one or more feeder Earth stations and a satellite. The satellite receives the signals and then transmits them down to end user stations with the use of one or more repeaters.

Current satellite transmission systems include fixed gain amplifiers with their operating points determined during the design of the communication system to achieve predetermined system performance goals. The transmission systems are designed at their inception with sufficient transmit power to overcome a low probability precipitation event which may otherwise have an adverse affect on signal reception at a particular location within the coverage area of the satellite. For example, a system requiring 99.9% link availability, with an accompanying 3 dB of rain attenuation in the transmission path, will be designed with 3 dB additional satellite radio frequency (RF) transmit power applied to or available for the given antenna beams. This RF transmit power is constant and cannot be adjusted over the lifetime of the satellite. Furthermore, the transmit power is applied to beams covering the entire broadcast area, which may be several times larger than a localized precipitation event. Consequently, satellite power requirements are oversized to achieve desired link availability and customer satisfaction during worst-case weather conditions. This sizing and utilization of RF transmit power is extremely inefficient, particularly where the satellite has a broad coverage area.

One prior art approach utilizes a low frequency beacon or reference beam signal to provide an indication of signal loss attenuation. The low frequency reference beam is less susceptible to attenuation and is used as a feedback signal to adjust the power of the uplink signal. As such, the fixed gain amplifiers receive a stronger signal which in turn results in a stronger downlink signal. Similar to the approach discussed above, this approach provides increased power to the entire broadcast region rather than selectively increasing power only in the region affected by a precipitation event.

SUMMARY OF THE INVENTION

Accordingly, it is an object of the present invention to provide a system and method for adjusting RF transmit power for a portion of the coverage area in response to signal attenuation.

It is a further object of the present invention to provide a system and method for pooling the total RF power applied to all spot beams and redistributing transmit power according to localized downlink signal attenuation.

It is still a further object of the present invention to provide a system and method for adjusting the antenna beam pattern gain to compensate for signal attenuation due to changes in the weather.

Yet another object of the present invention is to provide a system and method for reducing net RF transmit power while achieving desired communications performance as measured by data rate and link availability.

An additional object of the present invention is to provide a system and method for modifying the effective isotropic radiated power using a combination of RF power attenuation control and dynamic beam shaping of the transmit antenna beam pattern to compensate for precipitation induced signal attenuation.

In carrying out the above objects and other objects and features of the present invention, a system for controlling the transmit power to selectively increase power within a portion of a coverage region acquires signal loss information based on weather maps and/or actual downlink signal measurements. In one embodiment, radar reflectivity data is acquired and then translated via a series of analytical models into rain attenuation values. These analytical models may include, but are not limited to: 1) the satellite Earth geometry (elevation, slant range); 2) radar measurement parameters such as reflectivity, differential reflectivity, and/or differential phase; 3) models for raindrop size and orientation; and 4) site-specific information such as latitude, temperature, altitude, and the like. The calculations are performed on a computer located either within a ground station or on a satellite.

In the alternative, downlink power measurements may be made by a network operations and control center (NOCC). The NOCC is preferably capable of adjusting the number of sites polled and/or the monitoring or polling rate depending upon weather conditions in the localized regions within the satellite coverage area. In one embodiment, data from multiple sites within a single spot beam coverage are merged to create a single transmission loss or required minimum EIRP for the beam. Data from sites within an area coverage beam may be used to create an attenuation map for pattern optimization. The NOCC is preferably capable of processing terminal measurements and formulating a precipitation attenuation map similar to that which would be provided from a weather data source.

The present invention utilizes either the weather radar map, the downlink power measurement strategy, or a combination of both, to generate commands to selectively control the satellite transmit subsystem to adjust beam attenuation and beam patterns to increase signal transmit power within localized regions experiencing downlink power attenuation while reducing or maintaining transmit power to other localized regions.

The present invention may be implemented in any satellite transmit subsystem capable of adjusting RF transmit power and/or antenna gain patterns to vary EIRP to selected regions on the Earth. The EIRP adjustment required for transmission loss compensation will vary depending on the particular satellite transmit subsystem. For spot beam satellite coverage, the antenna gain pattern is fixed for each spot beam and EIRP is adjusted by modifing RF transmit power. In the case of broad area coverage, the antenna gain pattern is reshaped.

The advantages accruing to the present invention are many. The present invention increases link availability by reallocating RF transmit power to localized areas when required to allow for a lower net transmit power under normal weather conditions. Total RF transmit power is conserved with a corresponding reduction in DC power and thermal dissipation requirements on the satellite. Depending upon the particular application, this enables either increases in satellite functionality and/or increases in total capacity of the satellite communication system.

The above objects and other objects, features and advantages of the present invention will be readily appreciated by one of ordinary skill in the art from the following detailed description of the best modes for carrying out the invention when taken in conjunction with the accompanying drawings.

BEST MODE(S) FOR CARRYING OUT THE INVENTION

Figure 1:
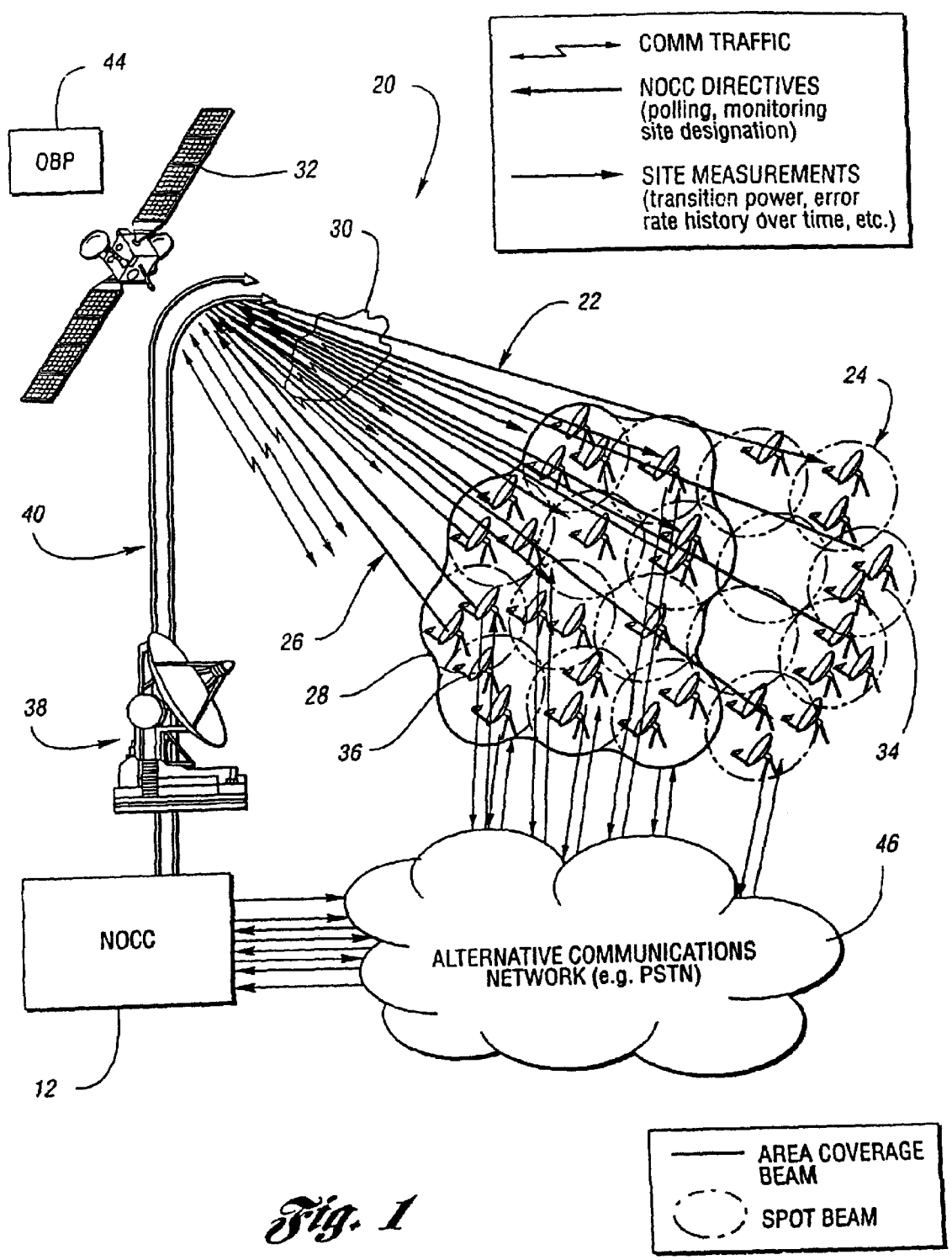
FIG. 1 is a block diagram illustrating a representative satellite communication system according to the present invention.

Referring now to FIG. 1, a block diagram of a representative satellite communication system 20 is shown. Satellite system 20 generally utilizes one of two methods to provide beam coverage for a particular region. The first method consists of a plurality of narrow discrete beams, indicated generally by reference numeral 22, pointed to different regions or cells 24 of the Earth. The second method consists of a wide area broadcast beam, indicated generally by reference numeral 26 covering a large area 28 of the Earth. When a precipitation event, represented by reference numeral 30, occurs between a satellite 32 and a user 34 serviced by one of spot beams 26, or a user 36 serviced by an area coverage beam 26, the communication signal is attenuated. Under these conditions, a user may experience a low quality signal or total loss of the signal.

Satellite communication system 20 includes a ground station 38 located on the Earth. Ground station 38 transmits communication signals via an uplink or feeder beam 40 to satellite 32 which is preferably in a geosynchronous orbit. As will be recognized by one of ordinary skill in this art, the present invention may be applied to communication systems with satellites in any of a number of orbits although implementation may be somewhat more complex. According to the present invention, satellite 32 is capable of adjusting its effective isotropic radiated power (EIRP) to compensate for communication signal transmission losses which may be caused by, for example, a precipitation event 30. A network operations and control center (NOCC) 42, which may be collocated with one of the ground stations 38, communicates with satellite 32 to provide various control commands which are processed by an on-board processor 44. A computer located on the ground within NOCC 42 or ground station 38 receives real-time or near real-time data indicative of path loss and calculates an EIRP adjustment for the corresponding communication signal attenuation caused by rain cell 30. Alternatively, on-board processor 44 may receive signal attenuation loss information and perform the appropriate transmit power control according to the present invention. Path loss information may be measured by polling various receive signal locations 34, 36, or estimated using weather maps generated by various regional and national weather services around the world. Weather information or path loss information may be communicated to NOCC 42 via an alternate communications network 46 which may be a public switched telephone network, for example. Alternatively, information may be communicated via a return link from users 34, 36 to on-board processor 44 or to NOCC 42 via satellite 32 and ground station 38. Once the EIRP value is determined, the corresponding RF transmit power is selectively adjusted for only those regions affected by the precipitation to overcome the communication signal transmission loss. For embodiments where the calculations are performed by NOCC 42, appropriate commands are transmitted to satellite 32 via ground station 38. Where on-board processor 44 performs the transmit power control calculations, appropriate commands may be communicated to the transmit power subsystem to appropriately adjust the antenna gain pattern and/or input level to achieve the desired RF transmit power.

The present invention is equally applicable to satellite communication systems utilizing a variety of antenna types. Four representative satellite subsystem configurations for satellite 32 are illustrated and described with reference to FIGS. 2–6. Accordingly, a first embodiment of a satellite communication system 20 according to the present invention includes satellite 32 utilizing a satellite transmit subsystem 50 as illustrated in the block diagram of FIG. 2. Satellite subsystem 50 is a single feed per spot beam antenna with a single amplifier per beam. Satellite subsystem 50 transmits spot beams to cover numerous cells within its footprint or broadcast area. Satellite transmit subsystem 50 includes a plurality of commandable attenuators 52 which receive signals from modulators and up-converters (not specifically illustrated). The outputs of commandable attenuators 52 are electrically connected to respective ones of a plurality of high-performance amplifiers (HPAs) 54 which are, in turn, connected to respective ones of a plurality of radiating antenna elements 56. One or more apertures, lenses, or reflectors 58 are used to direct the various spot beams to their respective coverage cell.

In operation, EIRP is adjusted by changing the radio frequency (RF) transmit power of the communication signal.

Figure 2:
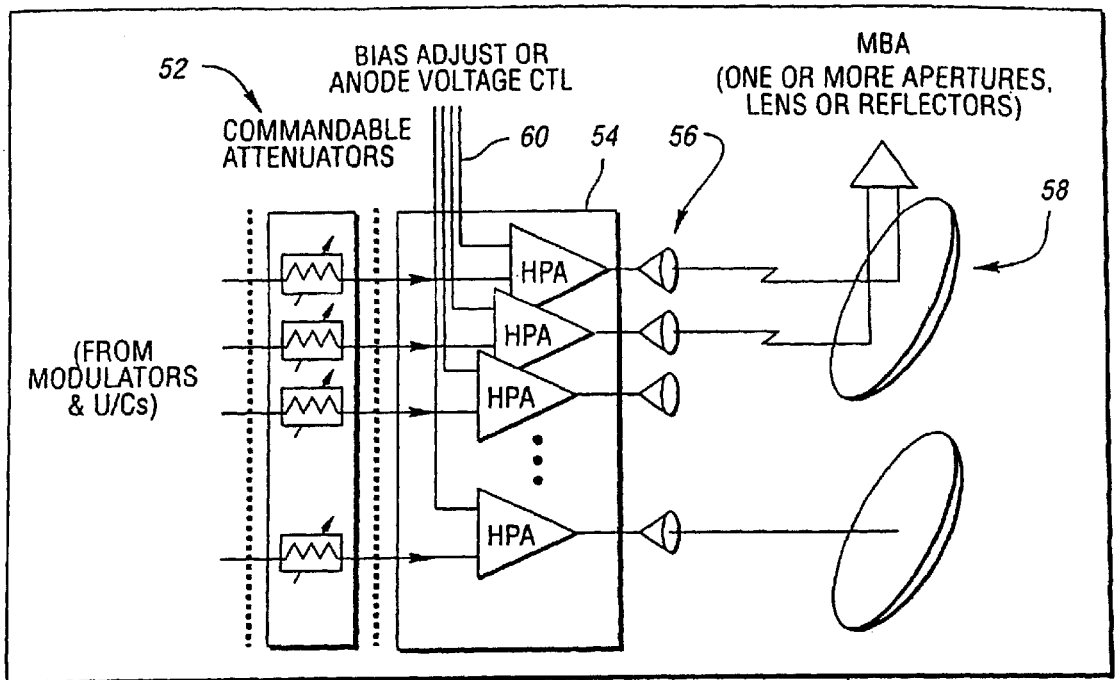
FIG. 2 is a block diagram illustrating an embodiment of the present invention having a multi-beam antenna with a single feed per beam, dedicated amplifier per beam, commendable attenuators, and adjustable amplifier biasing.
Figure 9:
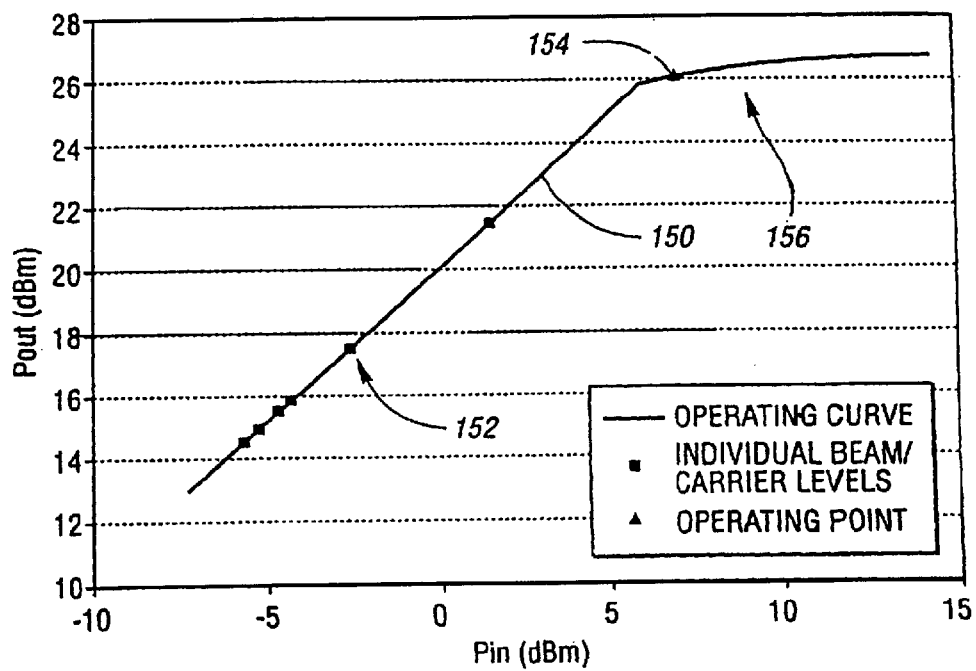
FIG. 9 is a graph illustrating amplifier output power as a function of input power for an HPA in one embodiment according to the present invention.

For the configuration illustrated in FIG. 2, the RF transmit power is adjusted by controlling the commandable attenuators 52 to vary the input power of HPAs 54. Commandable attenuators 52 may be controlled by on-board processor 44 or via commands generated by NOCC 42 to achieve a desired output power from HPAs 54. To optimize (minimize) the added DC power, anode voltage control 60 is preferably varied in conjunction with commandable attenuators 52. The basic operating curve for HPAs 54 illustrated in FIG. 9 is utilized to determine the correct attenuator settings to control total amplifier input loading and correct RF output power per beam. This configuration is capable of increasing HPA input/output power for a selected one or more HPAs. The availability of increased power to overcome isolated precipitation events allows a reduction of the overall net power for the satellite to provide a predetermined link availability in the presence of isolated attenuation loss. Instead of sizing the total DC power requirements by using worst-case signal attenuation values for all HPAs, the present invention sizes the total DC power based on path losses for an estimated subset of the cells serviced within the satellite footprint. As such, the present invention provides for pooling of transmit power and redistributing the power to a given one or more HPAs servicing one or more cells experiencing signal attenuation. The reduction of RF power requirements reduces DC power and thermal dissipation requirements on the satellite, enabling either increased satellite functionality and/or increased total capacity of the satellite communication system.

Figure 3:
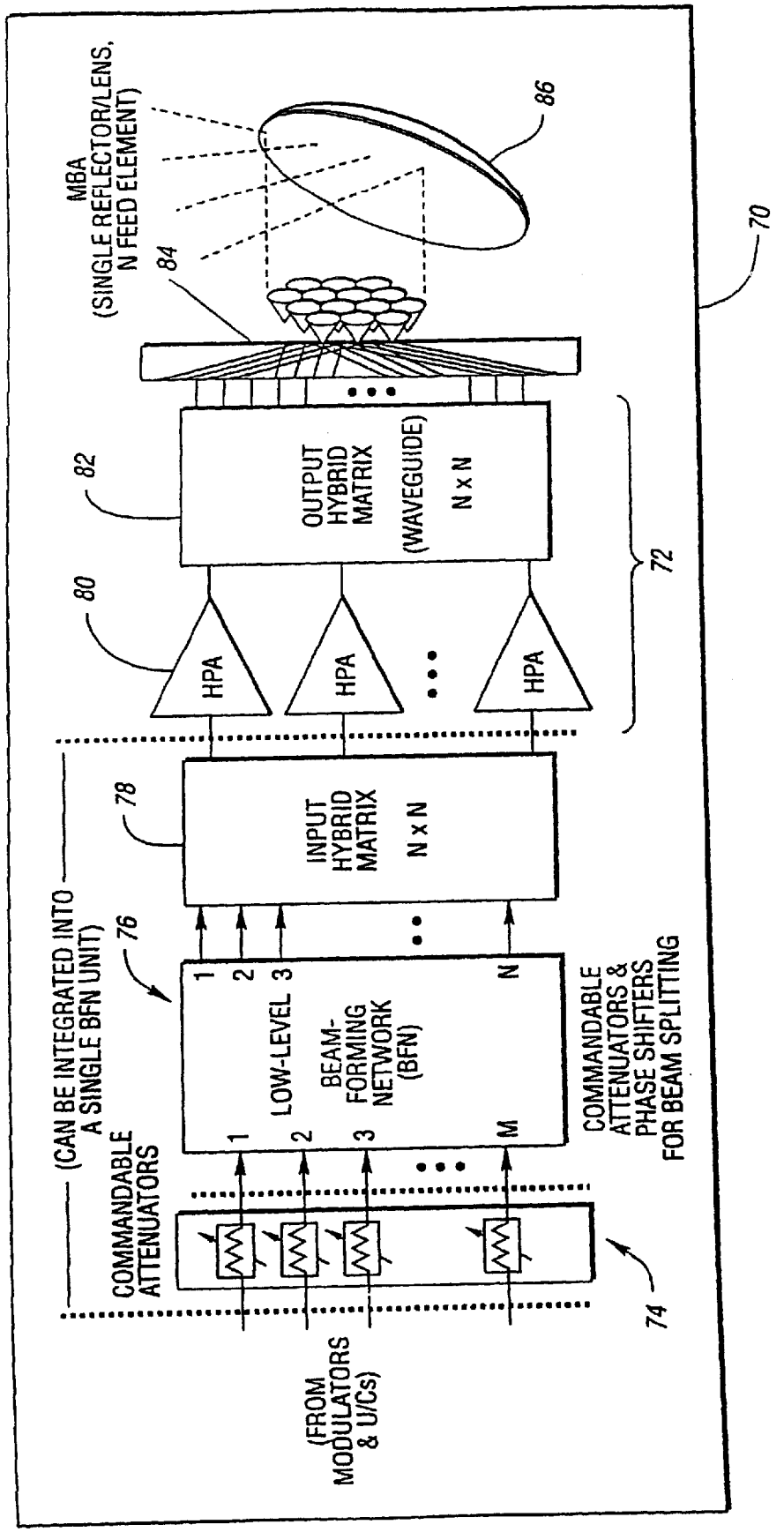
FIG. 3 is a block diagram illustrating another embodiment of the present invention having a multi-beam antenna with commandable attenuators, a low-level beamforming network, and a matrix amplifier.

A second embodiment of satellite communication system 20 includes satellite 32 having a satellite transmit subsystem 70 as illustrated in FIG. 3. Satellite transmit subsystem 70 is capable of transmitting spot beams 22 (FIG. 1) as well as wide area coverage beams 26 (FIG. 1). Transmit subsystem 70 includes a multiple beam antenna with a multiple feed per beam configuration having a matrix amplifier 72 which achieves power sharing across beams. Commandable input attenuators 74 receive input signals from conventional modulators and up-converters (not specifically illustrated). Commandable input attenuators 74 are in electrical communication with a low-level beamforming network (BFN) 76 which includes commandable attenuators and commandable phase shifters (not specifically illustrated) for beam shaping. BFN 76 is in electrical communication with an input hybrid matrix 78 which provides selectable connections to inputs of HPAs 80. Commandable input attenuators 74 may be integrated into a single BFN unit along with the attenuators and phase shifters for beam shaping, and input hybrid matrix 78. The outputs of HPAs 80 are selectively coupled via an output hybrid matrix 82 to antenna feed elements 84. A single reflector 86 or lens directs the various beams to their respective coverage regions.

In operation, the EIRP adjustment for transmission loss compensation according to the present invention is accomplished differently for spot beams than for area coverage beams for the embodiment illustrated in FIG. 3. However, for both types of beams, HPAs 80 are operated in a multicarrier mode. The antenna configuration is preferably designed so that resulting intermodulation products are radiated into space at different angles to improve the carrier to IM power ratio for a particular cell. The degree of spatial spreading and system internal IM levels generated depends upon the exact antenna and radiated beam configuration including the number of beams, beamwidths generated, and the like. For spot beams, the antenna gain pattern is fixed for each spot beam. The relative input power per beam is adjusted by commandable input attenuators 74. The sum total input power of all beams is kept constant at matrix amplifiers 72 by normalizing the settings for commandable input attenuators 74. For area coverage beams, the antenna gain pattern is re-shaped. This is accomplished by re-optimization of the beam weights within low-level BFN 76 for each feed using a pattern optimization program. The appropriate beam weights may be computed by on-board processor 44 or uploaded from the ground by NOCC 42.

Figure 4:
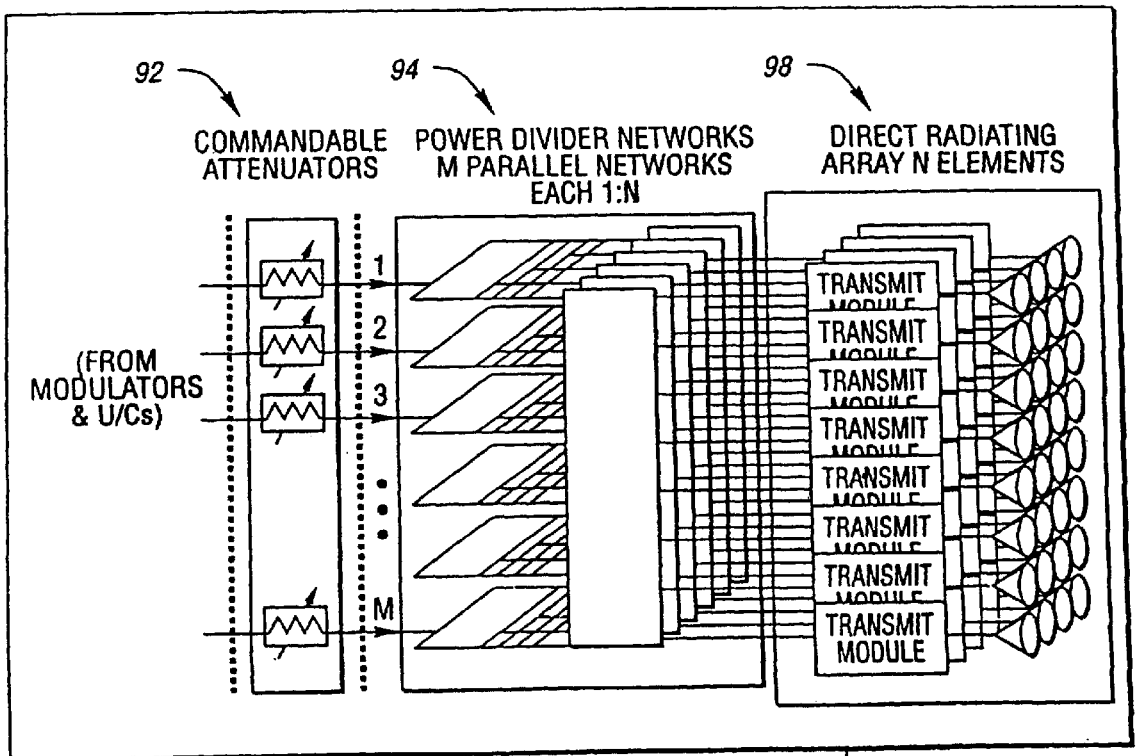
FIG. 4 is a block diagram illustrating an embodiment of the present invention having a multi-beam transmit phased array antenna with commandable attenuators to adjust the input beam, per-element beam steering and adjustable amplifier biasing.
Figure 5:
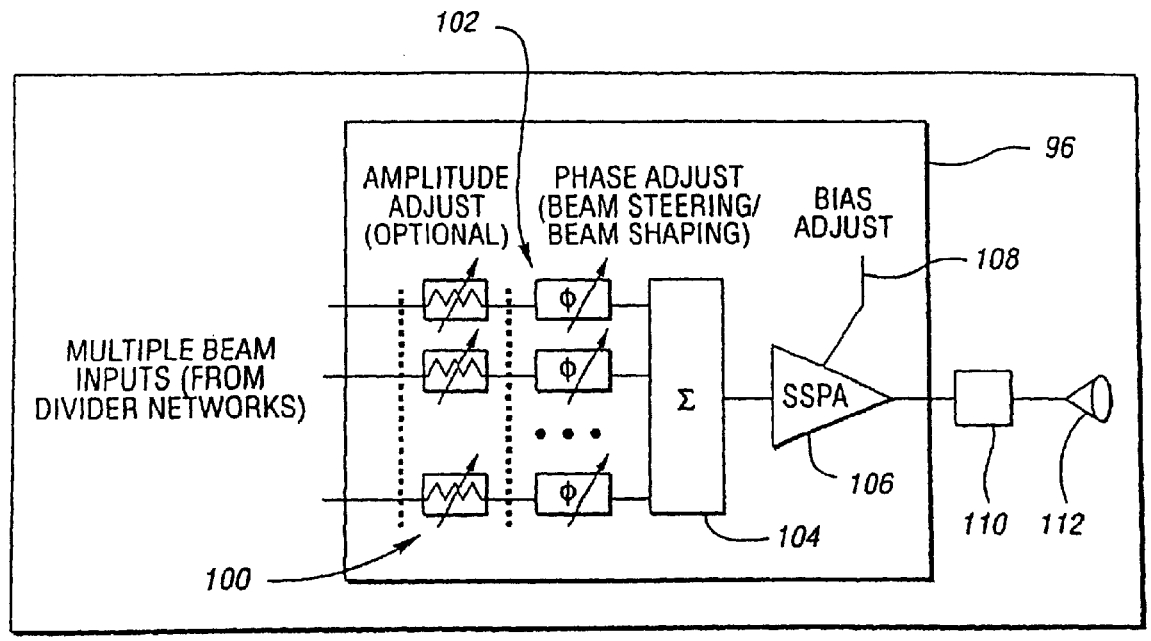
FIG. 5 is a block diagram illustrating transmit module electronics for a multi-beam phased array antenna as illustrated in FIG. 4.

A third embodiment of a satellite communication system 20 according to the present invention includes a planar phased-array with multiple steered beams sharing SSPA power on each radiating element as illustrated in the block diagrams of FIGS. 4 and 5. Similar to the subsystem illustrated in FIG. 3, satellite transmit subsystem 90 is capable of transmitting spot beams as well as area coverage beams. Satellite transmit subsystem 90 includes a plurality of commandable input attenuators 92 which having inputs connected to conventional modulators and up-converters (not specifically illustrated) and outputs electrically connected to a power divider network 94. As shown in FIG. 5, a transmit electronics module 96 is connected to the outputs of power divider network 94, with each of the radiating elements in direct radiating array 98 having an associated transmit electronics module 96. Multiple beam inputs from parallel divider networks 94 may be connected to corresponding ones of a plurality of optional commandable amplitude adjusters 100 and associated phase adjusters 102 which provide beam steering and beam shaping. The outputs of phase adjusters 102 are combined by a summer 104 which is connected to an associated SSPA 106 with a bias adjust control 108. The output of SSPA 106 is connected to an OMT/polarizer 110 which is, in turn, coupled to an associated radiating element 112.

As with the configurations illustrated and described with reference to FIGS. 2 and 3, satellite transmit subsystem 90 of FIG. 4 uses a basic amplifier operating curve, such as the curve illustrated in FIG. 9, to determine the correct settings for commandable input attenuators 92 to control total input loading for SSPAs 106 and correct RF output power per beam. SSPAs 106 are operated in a multicarrier mode with the antenna configurations designed to radiate the resulting intermodulation products into space at different angles. The degree of spatial spreading and system internal carrier to intermodulation levels generated depend upon the particular antenna and beam configurations. When operating in the spot beam configuration, the antenna gain pattern is fixed for each spot beam and satellite transmit subsystem 90 adjusts EIRP by adjusting RF transmit power. RF transmit power is adjusted by adjusting the relative input power per beam using commandable input attenuators 92. The sum total input power of all beams is kept constant at the SSPA 106 input by normalizing the settings of commandable input attenuators 92. When operating in the area coverage configuration, satellite transmit subsystem 90 adjusts EIRP by reshaping the antenna gain pattern. This may be achieved by performing a phase-only beam shaping optimization. The optimization generates phase weights which are applied to phase adjusters 102. The optimization of beam shaping is applied with a fixed amplitude taper which maintains transmit SSPA loading and efficiency, but adjusts the composite pattern gain to match a rain attenuation map illustrated and described with reference to FIGS. 7 through 12.

Figure 6:
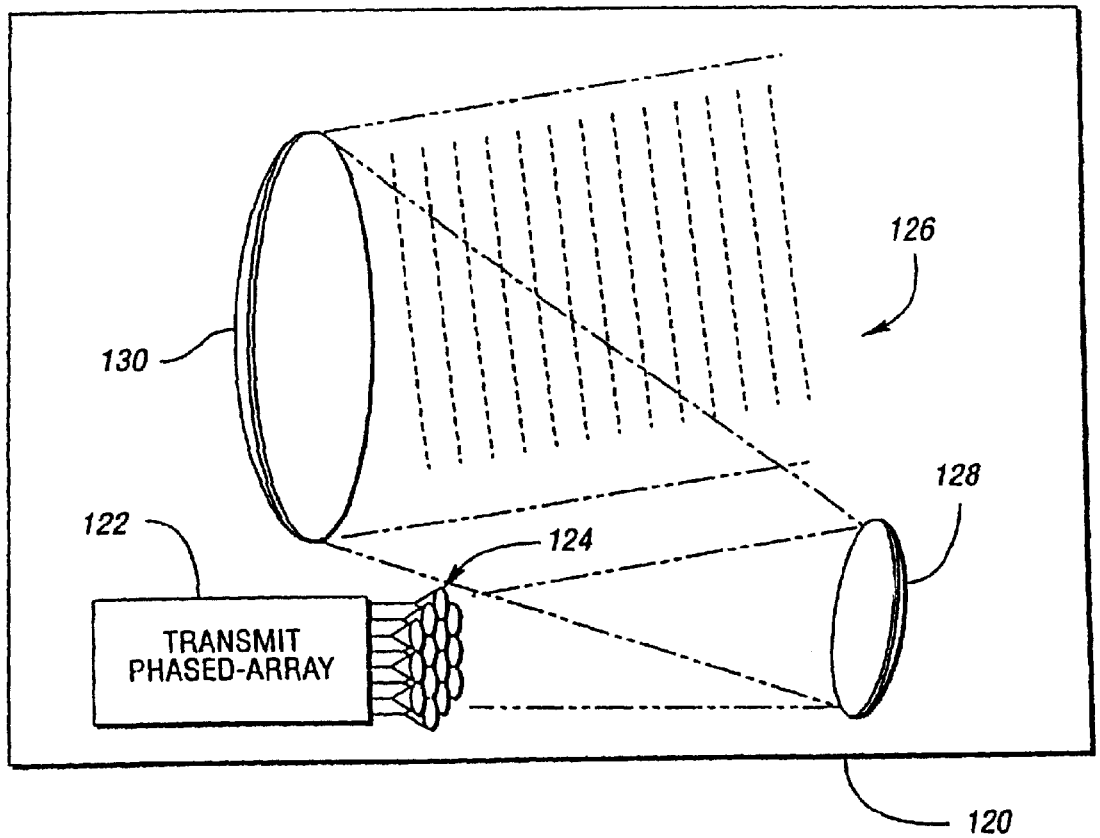
FIG. 6 is a block diagram of one embodiment of the present invention having a confocal imaging system with a multi-beam transmit array feed.

Another embodiment of the present invention using a confocal imaging system with a multi-beam transmit array feed is illustrated in FIG. 6. Satellite transmit subsystem 120 includes a planar phased array 122 similar to the multi-beam transmit phased array illustrated and described with reference to FIGS. 4 and 5. However, compared to the direct radiating array, transmit phased-array 122 includes a plurality of radiating elements 124 with reduced interelement spacing. Transmit phased array 122 is capable of transmitting spot beams as well as area coverage beams which are transmitted via confocal imaging system 126 which includes lenses or apertures 128 and 130.

In operation, satellite transmit subsystem 120 compensates for communication signal transmission loss by adjusting EIRP when operating in the spot beam configuration by adjusting RF transmit power. RF transmit power is adjusted by modifying the relative input power per beam by changing the settings of commandable input attenuators within transmit phased array 122. The sum total input power of all beams is kept constant at the SSPA inputs by normalizing the commandable attenuator settings. When satellite transmit subsystem 120 is operated in an area coverage beam configuration, EIRP is adjusted by changing the antenna gain pattern. A rain attenuation map or other path loss information may be used as a relative gain shape for antenna pattern optimization. The weather data or path loss information is preferably processed to develop an attenuation grid with resolution equal to or finer than the narrowest beamwidth for the antenna. This is achieved by performing a phase-only beam shaping optimization. The optimization generates phase weights which are applied prior to the amplifier at each radiating element. The optimization of beam shaping is applied with a fixed amplitude taper which maintains transmit SSPA loading and efficiency but adjusts the composite pattern gain to match the developed attenuation map.

In the case of spot beams, the EIRP corresponds directly to RF transmit power values. These values may be calculated on-board or sent to the satellite as a list of required attenuator settings per spot beam. A power management algorithm according to the present invention will ensure the total amplifier input loading level is maintained at an operating point which provides acceptable interference (carrier to intermodulation product) levels to maintain system link error rate performance.

Figure 7:
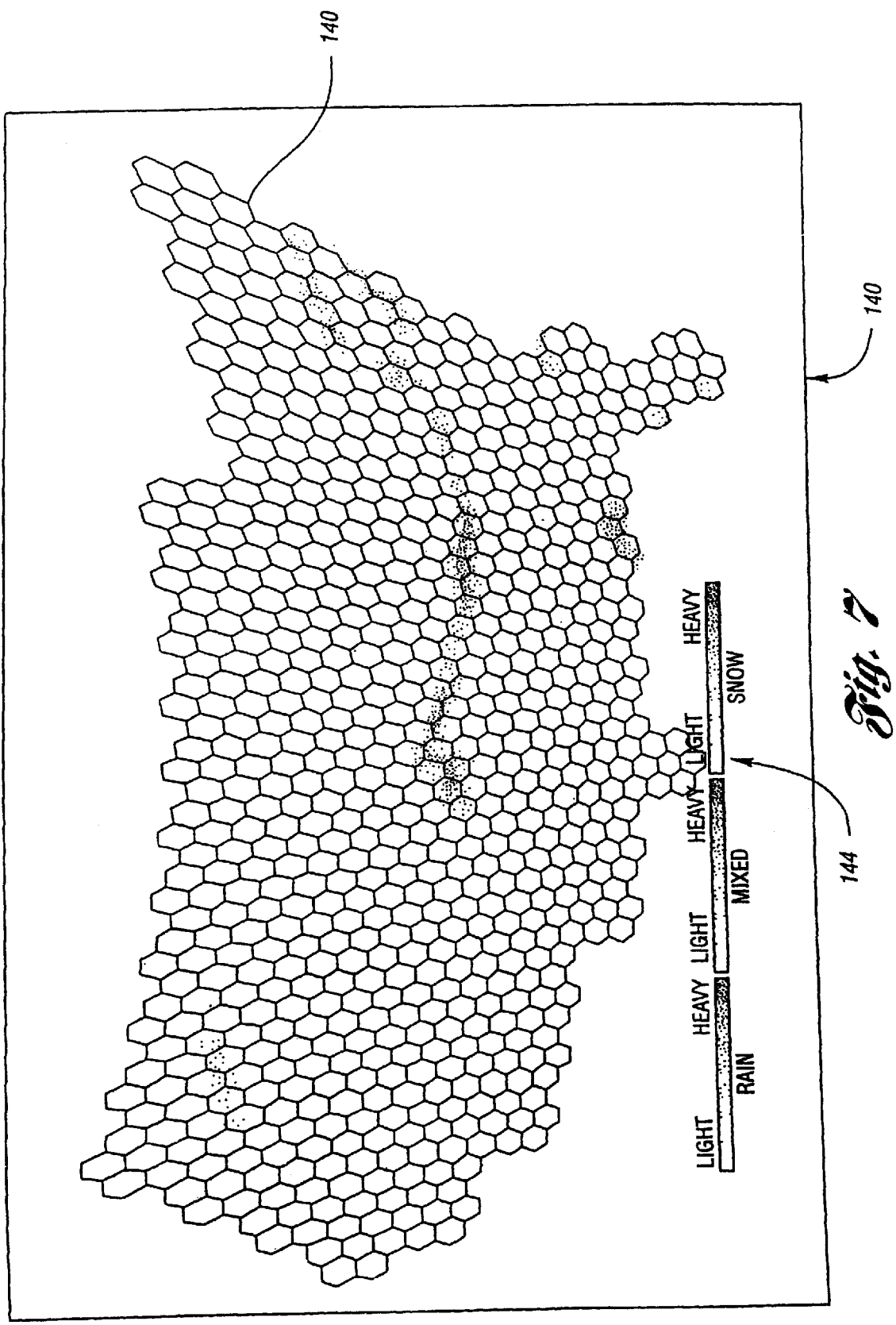
FIG. 7 is a representative map illustrating broadcast coverage for various spot beams in addition to weather information for use in a system or method according to the present invention.

The present invention utilizes real-time or near real-time transmission loss information to adjust the RF transmit power (or EIRP, or gain patterns and transmit power in combination) of the satellite to minimize total satellite DC power. Path loss information may be obtained using weather maps, or by downlink power measurements. FIG. 7 illustrates a representative weather map 140 having a plurality of cells 142 each covered by a corresponding spot beam. Precipitation information, indicated generally by reference numeral 144, provides an indication of the type (rain, snow, or mixed) and intensity (light to heavy) of precipitation for a particular geographic region. Such electronic weather maps are generated by many regional and national services across the globe. These maps are the result of a large network of weather radars. The data may also be integrated with satellite imagery data or rainfall measurement data to improve the accuracy and reliability of the data. In the United States, the data is available via the Internet from various sources licensed by the National Weather Service. The source data for this broadcast is the NEXRAD and NOWrad Doppler radar sites located throughout the United States. A representative weather map has a resolution of about 4 km$^2$ and is updated once each hour. For purposes of the description of the present invention, near real-time includes data which is updated on the order of hours whereas real-time refers to data which is updated on the order of seconds or less than about 5 minutes. The radar reflectivity data at the source of these maps can be translated via a series of analytical models into a rain attenuation value at the system downlink transmission frequency. These analytical models may include the satellite-earth geometry (elevation angles, slant range); radar measurement parameters such as reflectivity, differential reflectivity, and differential phase; models for raindrop size and orientation; and site specific information such as latitude, temperature, altitude, and the like.

As an alternative, or in combination, path loss information may be obtained using receive power measurements made by the system's own terminals which are then communicated to NOCC 42 via satellite 32 or alternate communications network 46. Alternatively, satellite 32 may use the information to generate appropriate attenuation maps and corresponding control commands as satellite processing power continues to improve and become more cost-effective. Certain sites may be designated by NOCC 42 for downlink power monitoring and will periodically send receive signal quality measurements (power or bit error rate (BER) measurements) to NOCC 42 as described above. Various sites may also be actively polled by NOCC 42 and can return the downlink signal quality measured in the polling test packet. NOCC 42 preferably adjusts the number of sites polled and the monitoring or polling rate depending upon weather conditions in the area. Also preferably, site selection is performed such that a sufficient number of sites are chosen within each of the geographical areas covered by the satellite downlink coverage beams. Data from multiple sites within a single spot beam coverage may be merged to create a single transmission loss or required minimum EIRP for the beam. Data from sites within a shaped area coverage beam may be used to generate an attenuation map for optimization purposes as illustrated and described with reference to FIGS. 10 and 11. The signal used for path loss monitoring may be either in-band or at another frequency band separate from the band being monitored. NOCC 42 processes the terminal measurements to formulate a rain attenuation map similar to that provided from the weather radar data sources. The attenuation map generated by actual path loss data is then process using the same algorithm as used for the weather information to generate the required EIRP for the antenna beams. Attenuation maps generated by path loss monitoring will generally be more accurate and timely since they are obtained from actual sites utilizing a downlink signal from the satellite.

The data utilized for generation of the attenuation maps is preferably sampled at a rate which allows for adequate estimation of the rain loss within a particular satellite's antenna beam coverages. Typically, rates of motion for precipitation events are less than 75 km/hr. The resolution of the antenna beam coverage, in kilometers, will determine the required sampling rate. For example, a 300 km antenna beam resolution would require samples every 48 minutes to achieve 5 updates per beam diameter (300/75/5 hours=4/5 hours=48 minutes). If the external weather radar map information is not available at the appropriate rate, other path loss data may be utilized, such as that acquired by polling or sampling receive downlink power. The attenuation information can be used in conjunction with the weather radar data to implement a rain cell geographic tracking algorithm within the NOCC. The resulting rain attenuation map is further processed to generate attenuation and antenna control commands for the transmit subsystem as illustrated and described with reference to FIGS. 2–6.

Figure 8:
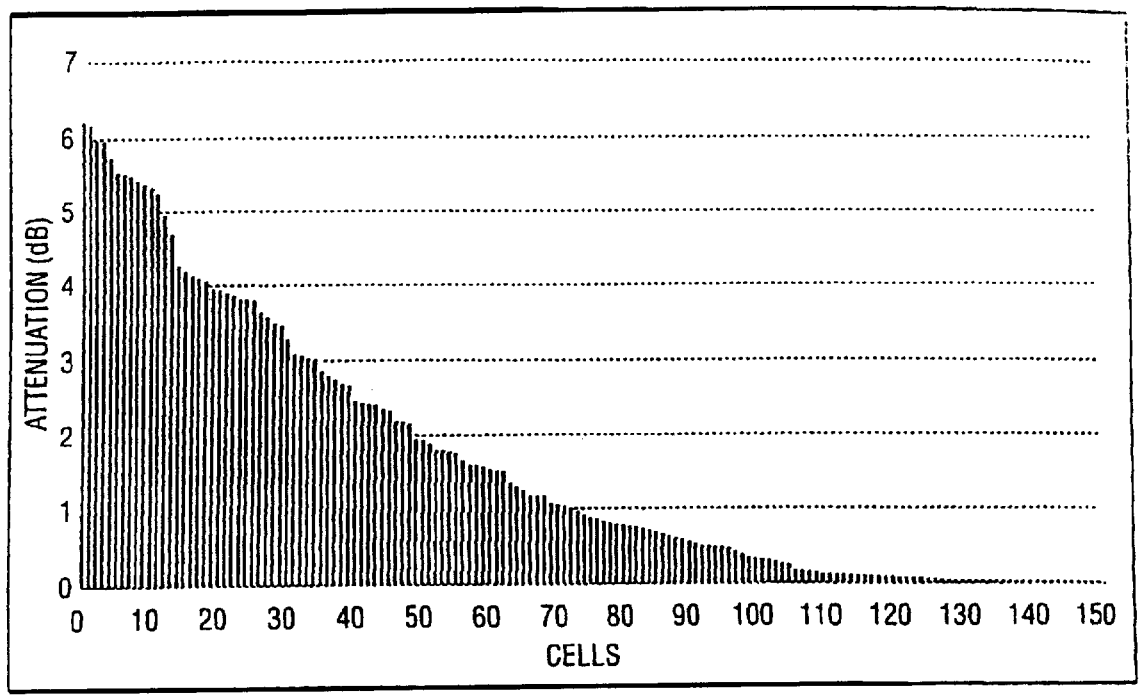
FIG. 8 is a graph illustrating rain attenuation relative to clear air sorted by decreasing attenuations for 150 cells.

FIG. 8 is a chart illustrating rain attenuation relative to clear air for 150 spot beam coverage cells, such as those illustrated in FIG. 7. The cells have been sorted by decreasing attenuation. This information is generated by an appropriate processor with control logic implemented in software, hardware, or a combination of software and hardware, based on either actual path loss data, weather information, or a combination of sources which may include one or both as discussed above. As such, a rain attenuation value is determined for each spot beam and used in conjunction with other link parameters, such as elevation angle, slant range, data rate, and the like, to size the required satellite EIRP for the transmission. In the case of spot beams, the EIRP corresponds directly to RF transmit power values. These values may be computed by an on-board processor or sent to the satellite from the NOCC as a list of required transmit power (or attenuator settings) per spot beam. An example of spot beam attenuator settings for eight simultaneous spot beams is provided in the tables below.

| Saturated Output Power | 27 | dBm |
| Output Backoff | 0.77 | OBO, dB |
| Operating point $P_{out}$ | 26.23 | dBm |
| Operating point $P_{in}$ | 7.00 | dBm |

| Beam # | Relative Gains (dB) | Relative Power | Normalized Power | $P_{in}$ (dBm) | $P_{out}$ (dBm) |
| --- | --- | --- | --- | --- | --- |
| 1 | 0.0 | 1.000 | 0.281 | 1.5 | 21.4 |
| 2 | 0.0 | 1.000 | 0.281 | 1.5 | 21.4 |
| 3 | −4.0 | 0.398 | 0.112 | −2.5 | 17.4 |
| 4 | −5.5 | 0.282 | 0.079 | −4.0 | 15.8 |
| 5 | −6.0 | 0.251 | 0.071 | −4.5 | 15.4 |
| 6 | −6.5 | 0.224 | 0.063 | −5.0 | 14.8 |
| 7 | −7.0 | 0.200 | 0.056 | −5.5 | 14.4 |
| 8 | −7.0 | 0.200 | 0.056 | −5.5 | 14.4 |

As illustrated in FIG. 9, an amplifier operating curve 150 is generated by plotting the amplifier output power ($P_{out}$) as a function of input power ($P_{in}$). Operating curve 150 is used to determine the individual beam/carrier levels 152 required of the spot beams so that the correct relative beam powers are achieved at the output while maintaining a relatively constant total amplifier loading. This positions the amplifier operating point 154 near saturation, indicated generally by reference numeral 156, where the amplifier power efficiency is greatest while assuring acceptable interference (carrier to intermodulation product ratio) to maintain required system BER performance.

Figure 10:
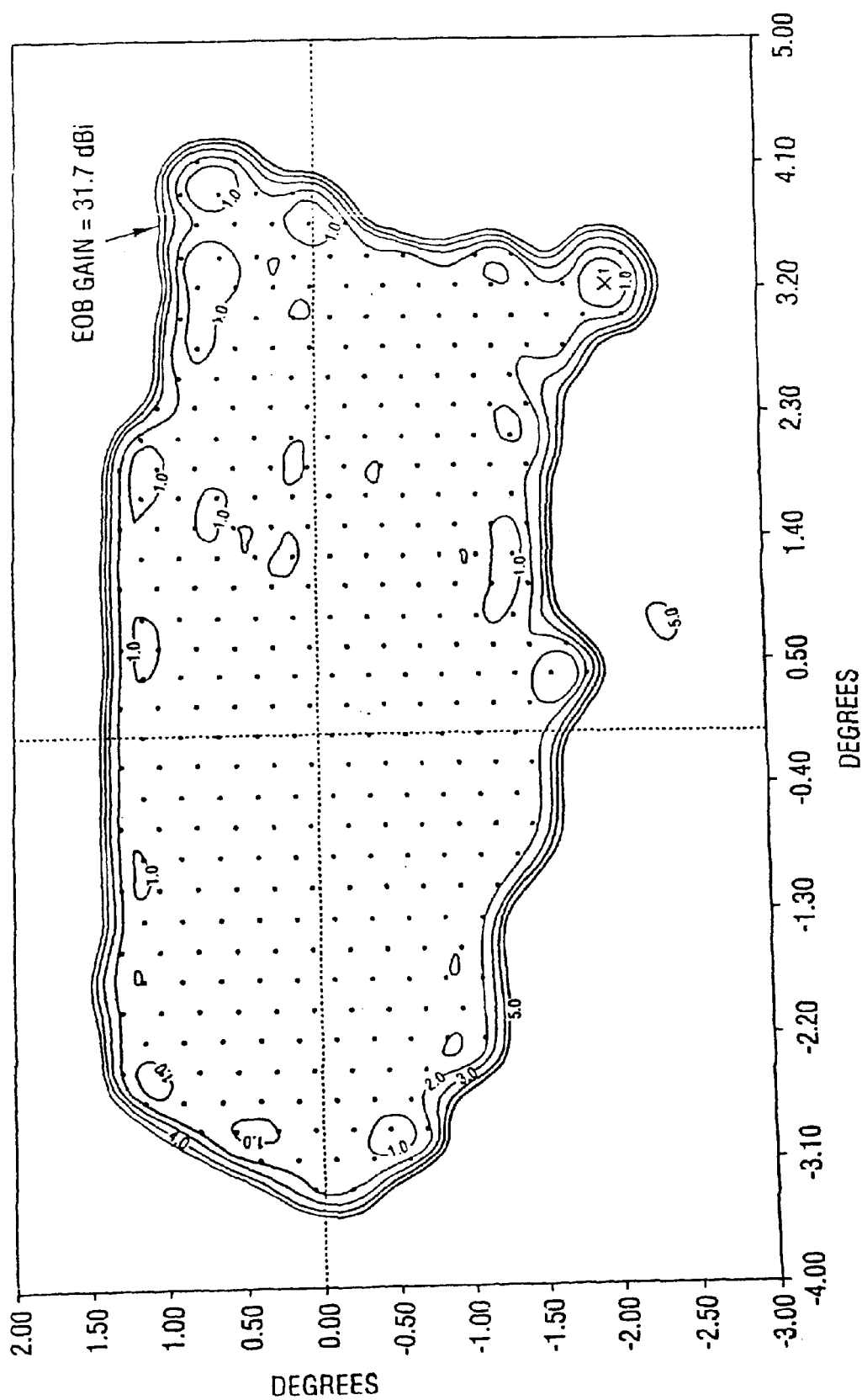
FIG. 10 is a representative contour map for an area coverage beam for clear air for use in a system or method according to the present invention.

In the case of an area coverage or broadcast beam, an attenuation map is used to determine the relative gain shape for antenna pattern optimization. The source data, whether from terminal receive power measurements or weather information, is processed to generate an attenuation grid which preferably has a resolution equal to or finer than the narrowest beamwidth from the antenna. In the case of a phased-array antenna implementation, the pattern optimization may utilize phase-only beam shaping to form the beam shape. A representative gain or attenuation contour map for an area coverage beam (CONUS) through clear air is illustrated in FIG. 10 with an edge-of-beam (EOB) gain of 31.7 dBi. Using path loss data or weather data, an adjusted attenuation or gain map may be generated according to the present invention as illustrated by the contour map of FIG. 11. The adjusted attenuation (gain) is then used to control the antenna gain pattern.

Figure 11:
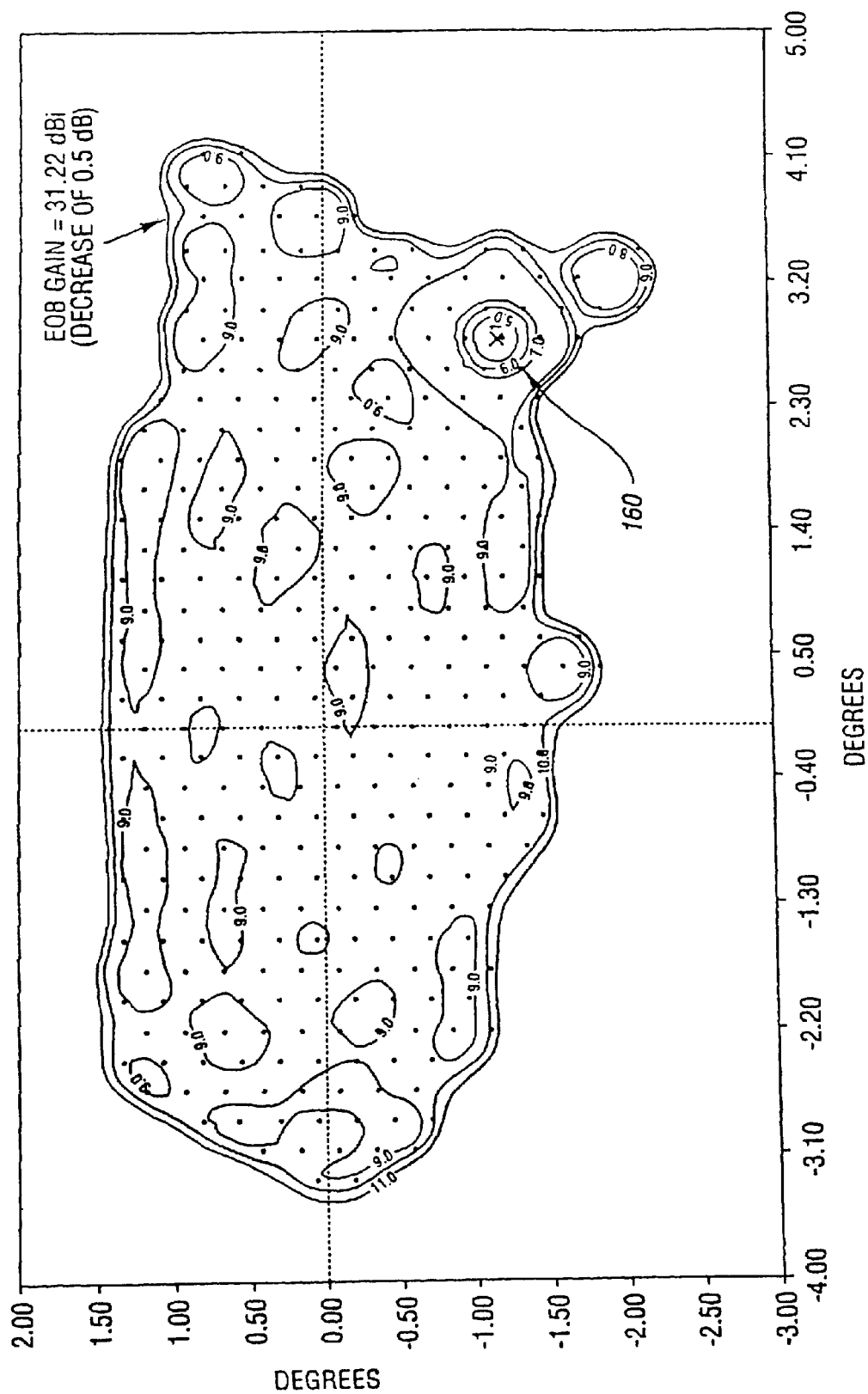
FIG. 11 is a representative contour map for an area coverage beam with selective gain modification to compensate for rain fade according to the present invention.

According to the present invention, the beam gain is raised by several dB at specific points in the coverage area while only decreasing the EOB gain by a small amount, thus allowing the communication system to pool its transmit power and redistribute it based on transmission signal attenuation loss within a given region smaller than the broadcast area or satellite footprint. The attenuation or gain contour map of FIG. 11 illustrates a single 7 dB peak gain region 160 having a gain of 38.1 dBi with an edge of beam (EOB) gain of 31.22 dBi which is a decrease of only 0.5 dB in the EOB gain compared to the clear air map of FIG. 10. Thus, the net RF power required to overcome a localized 7 dB rain attenuation fade in this example is only 0.5 dB over the RF power required in clear air. A conventional satellite broadcast beam with fixed antenna pattern would be required to add the full 7 dB of additional transmit power to service the small regions of the beam experiencing the rain outage. In contrast, the present invention utilizes a much smaller amount of additional RF transmit power for localized gain increases (in excess of that required in clear air conditions) which is a function of the fraction of the area coverage experiencing rain attenuation and the level of the attenuation. This, enables the satellite to be designed with less signal transmit power resulting in more cost-effective implementation and operation of the satellite communication system.

The power management algorithm ensures that the total amplifier input loading level is maintained at an operating point which provides acceptable interference (carrier to intermodulation product) levels to maintain system link error rate performance. The algorithm monitors total DC power consumption and thermal dissipation over a period of time to ensure that the transmit subsystem is performing within limits imposed by the satellite electrical power and thermal control systems.

Figure 12:
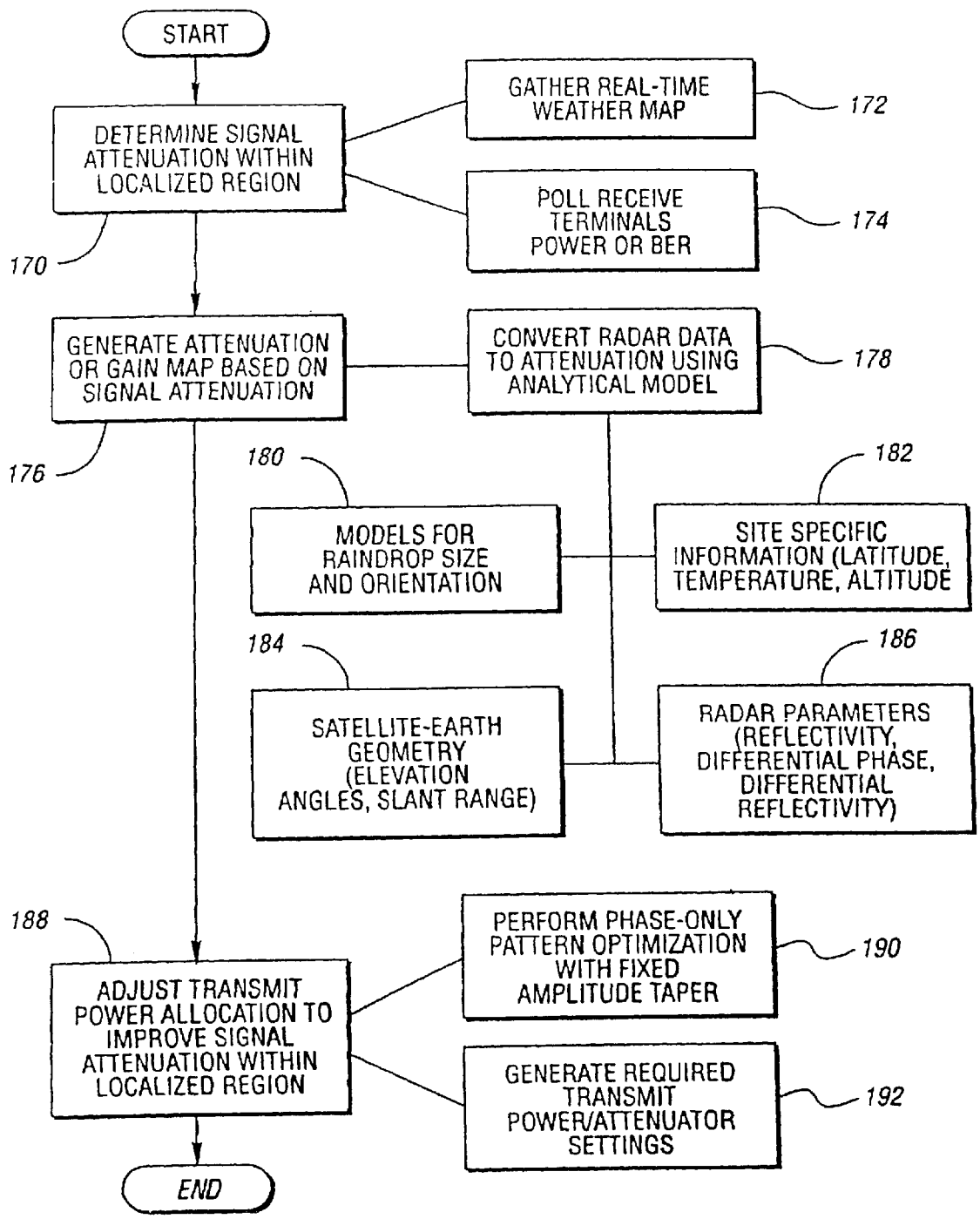
FIG. 12 is a flow chart illustrating operation of a system or method for adaptive transmission loss compensation according to the present invention.

Referring now to FIG. 12, a flow chart illustrating a method for adjusting communication signal transmit power to compensate for communication signal attenuation according to the present invention is shown. One of ordinary skill in the art will recognize that the various steps illustrated may be performed by software, hardware, or a combination of both. Likewise, the present invention transcends the particular implementation in terms of processing hardware, software, and location, i.e. whether located on the ground or on the satellite. FIG. 12 illustrates sequential operations for convenience only. Various steps or functions may be performed in a different order or simultaneously based on the particular implementation without departing from the spirit or scope of the present invention.

Signal attenuation within at least one localized region of the satellite beam coverage is determined as represented by block 170. This may include receiving or gathering real-time or near real-time weather data from one or more weather information sources as represented by block 172. Alternatively, or in combination, signal attenuation or path losses may be estimated using receive power, bit error rate (BER), or other equivalent measurements made at one or more receiving terminals as represented by block 174 and described in greater detail above. The signal attenuation information obtained using the weather data or path loss data is used to generate an attenuation or gain map as represented by block 176. For weather data, the radar reflectivity data may be translated to attenuation data using analytical models as represented by block 178. The analytical models may include models for raindrop size and orientation as represented by block 180, site specific information such as latitude, temperature, and altitude, as represented by block 182, satellite-earth geometry including elevation angles and slant range as represented by block 184, and/or radar parameters such as reflectivity, differential phase and differential reflectivity as represented by block 186.

The attenuation or gain map generated using the weather data and/or path loss information is then used to adjust the communication signal transmit power of the satellite to increase received signal power within at least one localized region of the satellite beam coverage as represented by block 188. This may include performing a phase-only pattern optimization with a fixed amplitude taper for phased-array area coverage implementations as represented by block 190, or generating a list of required transmit power or attenuator settings for spot beam applications as represented by block 192.

As such, the present invention utilizes real-time information on weather conditions and path losses within localized regions of areas to be serviced by the satellite beams to adjust the EIRP of the satellite beams to minimize the total RF power required for transmission. The transmission system may be realized using a variety of antenna types. The present invention allows for the reduction of RF transmit power to achieve the same communications performance enabling either increases in satellite functionality and/or an increase in total capacity of the satellite communication system.

While the best mode contemplated for practicing the invention has been described in the case of transmission from the satellite, those familar with the art to which the invention relates will recognize various alternative designs and embodiments. For example, in the reception case, the antenna pattern may be adjusted to provide more gain in the direction of users suffering rain attenuation, at the expense of less gain in the direction of users that are not suffering rain attenuation. The antenna gain may be increased by several dB at specific points in the coverage area while decreasing the edge-of-beam gain by only a small amount. The invention is defined by the following claims.

What is claimed is:

1. A system for compensating for communication signal attenuation within at least one localized region of a coverage area of a satellite having a portion of a total communication signal transmit power allocated thereto, the system comprising:
   a receiver for receiving data indicative of communication signal attenuation within the at least one localized region;
   a processor in communication with the receiver for calculating a communication signal transmit power compensation adjustment for each of the at least one localized region based on the signal attenuation;
   a satellite transmission system in communication with the processor for adjusting communication signal transmit power allocated to each of the at least one localized region based on the compensation adjustment calculated by the processor to compensate for the communication signal attenuation, and wherein the satellite transmission system further comprises:
      a plurality of commandable attenuators for adjusting input power level;
      a plurality of amplifiers in communication with corresponding ones of the plurality of commandable attenuators, the amplifiers including an anode voltage adjustment to adjust associated operating points; and
      a plurality of antenna feed elements in communication with corresponding ones of the plurality of amplifiers wherein the plurality of feed elements transmits a corresponding plurality of beams with a single feed element per beam and wherein the processor calculates the signal transmit power compensation adjustment to control the commandable attenuators and the anode voltage adjustment for each of the amplifiers.

2. The system of claim 1 wherein the processor and the satellite transmission system are collocated on a satellite.

3. A system for compensating for communication signal attenuation within at least one localized region of a coverage area of a satellite having a portion of a total communication signal transmit power allocated thereto, the system comprising:
   a receiver for receiving data indicative of communication signal attenuation within the at least one localized region;
   a processor in communication with the receiver for calculating a communication signal transmit power compensation adjustment for each of the at least one localized region based on the signal attenuation;
   a satellite transmission system in communication with the processor for adjusting communication signal transmit power allocated to each of the at least one localized region based on the compensation adjustment calculated by the processor to compensate for the communication signal attenuation, and wherein the satellite transmission system further comprises:
      a plurality of commandable attenuators for adjusting input power level;
      a matrix amplifier connected to the plurality of commandable attenuators, the matrix amplifier including an input hybrid matrix, a plurality of amplifiers, and an output hybrid matrix; and
      a low-level beam forming network in communication with the matrix amplifier, wherein the processor calculates the signal transmit power compensation adjustment to control the commandable attenuators while maintaining a substantially constant total power at inputs to the plurality of amplifiers.

4. The system of claim 3 wherein the processor and the satellite transmission system are collocated on a satellite.

5. The system of claim 3 wherein the processor calculates the signal transmit power compensation adjustment to modify an antenna gain pattern via the plurality of transmit modules.

6. A system for compensating for communication signal attenuation within at least one localized region of a coverage area of a satellite having a portion of a total communication signal transmit power allocated thereto, the system comprising:
   a receiver for receiving data indicative of communication signal attenuation within the at least one localized region;
   a processor in communication with the receiver for calculating a communication signal transmit power compensation adjustment for each of the at least one localized region based on the signal attenuation;
   a satellite transmission system in communication with the processor for adjusting communication signal transmit power allocated to each of the at least one localized region based on the compensation adjustment calculated by the processor to compensate for the communication signal attenuation, and wherein the satellite transmission system further comprises:
      a plurality of commandable attenuators for adjusting input power level;
      a plurality of power divider networks connected to the plurality of commandable attenuators;
      a plurality of transmit modules each including a plurality of amplitude adjusters having outputs combined by a summer, the amplitude adjusters and the phase adjusters providing beam steering and beam shaping functions;

a plurality of amplifiers connected to respective ones of the plurality of transmit modules; and a plurality of feed elements connected to the plurality of amplifiers, the feed elements forming a planar phased array, wherein the processor calculates the signal transmit power compensation adjustment to modify input power via the commandable attenuators to adjust spot beams.

7. The system of claim 6 wherein the processor calculates the signal transmit power compensation adjustment to modify amplitude or phase of area coverage beams via the plurality of transmit modules.

8. The system of claim 6 further comprising:

a confocal imaging system including at least two reflecting elements positioned to receive communication signals transmitted by the plurality of antenna feed elements.

9. The system of claim 6 wherein the processor and the satellite transmission system are collocated on a satellite.

10. The system of claim 6 wherein the processor calculates amplitude and phase coefficients in order to modify the area coverage beams for a receiving antenna on the spacecraft.

11. The system of claim 10 wherein the receiver and the processor are collocated on a satellite.

12. A method for controlling satellite communication signal transmit power to compensate for attenuation of a downlink signal due to precipitation within a localized region of a coverage area of a satellite, the satellite in communication with a network operations control center which is in communication with at least one source of weather information, the method comprising:

receiving weather information at the network operations control center indicative of precipitation within the localized region;

generating an attenuation map by converting the weather information to estimated signal attenuation within the localized region using an analytical model;

transmitting control commands from the network operations control center to the satellite to increase communication signal transmit power within the localized region while substantially maintaining or reducing communication signal transmit power within other localized regions of the satellite coverage area to minimize total satellite transmit power.

13. The method of claim 12 wherein generating an attenuation map comprises processing radar data including at least one of the group consisting of reflectivity, differential phase, and differential reflectivity.

14. The method of claim 12 wherein receiving weather information comprises receiving data via a public switched telephone network.

\* \* \* \* \*